United States Patent
Ogihara et al.

(10) Patent No.: US 12,240,171 B2
(45) Date of Patent: Mar. 4, 2025

(54) MATERIAL DISPENSE DEVICE, THREE-DIMENSIONAL SHAPING DEVICE, AND INJECTION MOLDING DEVICE

(71) Applicant: SEIKO EPSON CORPORATION, Tokyo (JP)

(72) Inventors: Masaaki Ogihara, Matsumoto (JP); Kazuhide Nakamura, Asahi (JP); Taki Hashimoto, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 130 days.

(21) Appl. No.: 18/099,989

(22) Filed: Jan. 23, 2023

(65) Prior Publication Data

US 2023/0234286 A1    Jul. 27, 2023

(30) Foreign Application Priority Data

Jan. 24, 2022    (JP) .................................. 2022-008587

(51) Int. Cl.
*B29C 64/209*    (2017.01)
*B29C 45/20*    (2006.01)
(Continued)

(52) U.S. Cl.
CPC ............ *B29C 64/209* (2017.08); *B29C 45/20* (2013.01); *B33Y 30/00* (2014.12); *B29C 64/118* (2017.08); *B33Y 10/00* (2014.12)

(58) Field of Classification Search
CPC .................................................. B29C 64/209
See application file for complete search history.

(56) References Cited

U.S. PATENT DOCUMENTS

| 2,567,693 | A | * | 9/1951 | Brunner | .................. | B29C 45/20 |
| | | | | | | 425/192 R |
| 7,018,197 | B2 | * | 3/2006 | Babin | .................... | B29C 45/278 |
| | | | | | | 425/549 |

(Continued)

FOREIGN PATENT DOCUMENTS

| CA | 2061731 A1 * | 9/1992 | ............ B29C 45/231 |
| DE | 4005437 A1 * | 8/1991 | .............. B29C 45/27 |

(Continued)

*Primary Examiner* — Atul P. Khare
(74) *Attorney, Agent, or Firm* — Harness, Dickey & Pierce, P.L.C.

(57) ABSTRACT

A material dispense device includes a nozzle portion that dispenses a material, and a main body portion that has a flow path for a material and to which the nozzle portion is attached. The main body portion includes a body portion having an outlet of the flow path, and a male screw provided at an outer periphery of the body portion. The nozzle portion has a dispense opening at a front end of an in-nozzle flow path for the material, and includes a nozzle tip that is pressed against the body portion in an arrangement of communicating with the flow path. The nozzle portion further includes a pressing member that presses the nozzle tip against the body portion in a state in which the dispense opening is exposed to the outside. The pressing member includes a female screw at an inner periphery thereof. By fastening the female screw of the pressing member to the male screw of the body portion, the nozzle tip is pressed against the body portion.

10 Claims, 6 Drawing Sheets

(51) Int. Cl.
  *B33Y 30/00* (2015.01)
  *B29C 64/118* (2017.01)
  *B33Y 10/00* (2015.01)

(56) References Cited

U.S. PATENT DOCUMENTS

| | | | | |
|---|---|---|---|---|
| 7,201,335 | B2 * | 4/2007 | Babin | B29C 45/2711 |
| | | | | 239/592 |
| 2017/0210074 | A1 | 7/2017 | Ueda et al. | |
| 2022/0305709 | A1 * | 9/2022 | Horimoto | B29C 45/176 |
| 2022/0324166 | A1 * | 10/2022 | Lorusso | B29C 48/2886 |

FOREIGN PATENT DOCUMENTS

| | | | | | |
|---|---|---|---|---|---|
| EP | 1029647 | A1 | * | 8/2000 | ......... B29C 45/2756 |
| GB | 634853 | A | * | 3/1947 | ............. B29C 45/20 |
| JP | S62134234 | A | * | 6/1987 | |
| JP | 3033237 | B2 | * | 4/2000 | ............. B29C 45/20 |
| WO | 2015/182675 | A1 | | 12/2015 | |

* cited by examiner

MATERIAL DISPENSE DEVICE, THREE-DIMENSIONAL SHAPING DEVICE, AND INJECTION MOLDING DEVICE

The present application is based on, and claims priority from JP Application Serial Number 2022-008587, filed Jan. 24, 2022, the disclosure of which is hereby incorporated by reference herein in its entirety.

BACKGROUND

1. Technical Field

The present disclosure relates to a material dispense device, and a three-dimensional shaping device and an injection molding device including the material dispense device.

2. Related Art

An example of a material dispense device is described in WO2015/182675. WO2015/182675 discloses that, in a three-dimensional printing system including a head for feeding a first continuous material containing a resin and a second continuous material containing a fiber, a nozzle opening can be changed by replacing a nozzle with another nozzle (paragraph 0030).

As a result of continuous use, a carbonized resin may be formed on an outer surface of the nozzle. In a structure in which the nozzle is fastened to a female screw formed in an attached portion on a main body side by a male screw formed on an outer surface of the nozzle, the carbonized resin may enter the fastening portion with the attached portion. In this case, the carbonized resin may be mixed into the nozzle when the nozzle is replaced.

That is, foreign matter may be mixed during nozzle replacement, which may cause nozzle clogging. However, in WO2015/182675, there is no description in consideration of this point.

SUMMARY

In order to solve the above problems, a material dispense device according to the present disclosure includes: a nozzle portion configured to dispense a material; a main body portion that has a flow path for the material and to which the nozzle portion is attached. The main body portion includes a body portion provided with a male screw at an outer periphery thereof and having an outlet of the flow path. The nozzle portion includes: a nozzle tip that has a dispense opening at a front end of an in-nozzle flow path, and that is pressed against the body portion in an arrangement in which the in-nozzle flow path and the outlet of the flow path communicate with each other; and a pressing member configured to press the nozzle tip against the body portion in a state in which the dispense opening is exposed to outside, and having a female screw capable of being fastened to the male screw at an inner periphery of the pressing member. The nozzle tip is pressed against the body portion by fastening the male screw and the female screw.

A three-dimensional shaping device according to the present disclosure includes: a material dispense device configured to dispense a material for shaping; and a platform on which the material dispensed from the material dispense device is stacked. The material dispense device is a material dispense device including a main body portion having the body portion, the nozzle tip, and the pressing member.

An injection molding device according to the present disclosure includes: a material dispense device configured to dispense a material for injection molding; and a fixing portion configured to fix a mold that receives the material dispensed from the material dispense device. The material dispense device is a material dispense device that includes a main body portion including the body portion, the nozzle tip, and the pressing member.

DESCRIPTION OF EXEMPLARY EMBODIMENTS

Hereinafter, the present disclosure will be schematically described first.

In order to solve the above problems, a material dispense device according to a first aspect of the present disclosure includes: a nozzle portion configured to dispense a material; a main body portion that has a flow path for the material and to which the nozzle portion is attached. The main body portion includes a body portion provided with a male screw at an outer periphery thereof and having an outlet of the flow path. The nozzle portion includes: a nozzle tip that has a dispense opening at a front end of an in-nozzle flow path, and that is pressed against the body portion in an arrangement in which the in-nozzle flow path and the outlet of the flow path communicate with each other; and a pressing member configured to press the nozzle tip against the body portion in a state in which the dispense opening is exposed to outside, and having a female screw capable of being fastened to the male screw at an inner periphery of the pressing member. The nozzle tip is pressed against the body portion by fastening the male screw and the female screw.

According to the present aspect, a male screw is provided at the outer periphery of the body portion, and a female screw is provided at an inner periphery of the pressing member that presses the nozzle tip against the body portion. That is, it is not necessary to provide a male screw on the nozzle tip as in the related art. By fastening the female screw of the pressing member to the male screw of the body portion, the nozzle tip is fixed in a state of being pressed against the body portion.

Therefore, even if foreign matter adheres to an outer surface of the nozzle tip due to continuous use, and further, foreign matter adheres to a fastening portion of the female screw and the male screw, the fastening portion is positioned on an outer peripheral side of the body portion and is not positioned on an inner surface side of the flow path. Therefore, when the nozzle tip is replaced, the foreign matter is less likely to be mixed into the flow path for the material. That is, it is possible to reduce a possibility that, foreign matter is mixed during replacement of the nozzle tip and nozzle clogging is caused.

According to the present aspect, it is possible to easily increase diameters of the female screw of the pressing member and the male screw of the body portion. Accordingly, it is possible to tighten the pressing member to the body portion with a stronger axial force, and it is possible to reduce leakage of the material from a portion, that is, a sealing surface where the nozzle tip is pressed against and comes into contact with the body portion.

According to the present aspect, since it is not necessary to provide a screw portion such as a male screw on the nozzle tip, the manufacturing thereof becomes easy. Accordingly, it is possible to reduce the manufacturing cost of the nozzle tip which is also a replacement target as a consumable item.

The material dispense device according to a second aspect of the present disclosure is directed to the first aspect, in which an outer surface of the nozzle tip has a shape tapered toward the dispense opening, an inner surface of the pressing member has a shape matching the outer surface of the nozzle tip, and the pressing member has an exposure opening that exposes the dispense opening of the nozzle tip to outside.

According to the present aspect, the outer surface of the nozzle tip has a shape tapered toward the dispense opening. Further, the pressing member has the exposure opening that has a shape matching the tapered shape and that exposes the dispense opening of the nozzle tip to the outside.

Therefore, by fastening the pressing member to the body portion in a state in which the dispense opening of the nozzle tip is exposed to the outside from the exposure opening of the pressing member, it is possible to attach the nozzle tip to the body portion in a state in which the nozzle tip is strongly pressed against the body portion.

The material dispense device according to a third aspect of the present disclosure is directed to the second aspect, in which, in a state in which the dispense opening is positioned inside the exposure opening and the male screw and the female screw are coupled to each other, an axial center line of the in-nozzle flow path and an axial center line of the flow path of the body portion are in a straight line.

According to the present aspect, the axial center line of the in-nozzle flow path and the axial center line of the flow path of the body portion are in the straight line in a state in which the tapered shape of the nozzle tip is set in the exposure opening of the pressing member. Therefore, when the female screw of the pressing member is fastened to the male screw of the body portion in the state in which the nozzle tip is set in the exposure opening, since the axial center line of the in-nozzle flow path and the axial center line of the flow path of the body portion are in the straight line, an alignment of both the axial center lines can be easily achieved.

The material dispense device according to a fourth aspect of the present disclosure is directed to the first aspect, in which hardness of the nozzle tip is lower than hardness of the body portion.

According to the present aspect, the hardness of the nozzle tip is lower than that of the body portion. Accordingly, the nozzle tip is elastically deformed by a pressing force of the pressing member and is pressed against the hard body portion. Therefore, the nozzle tip can be attached to the body portion with good adhesion.

The material dispense device according to a fifth aspect of the present disclosure is directed to the first aspect, in which a thermal conductivity of the nozzle tip is lower than that of the body portion.

According to the present aspect, the thermal conductivity of the nozzle tip is lower than the thermal conductivity of the body portion. Accordingly, a degree of freedom in selecting the material that can be used for the nozzle tip is increased, and design and manufacture are facilitated. In addition, cost reduction can also be achieved.

The material dispense device according to a sixth aspect of the present disclosure is directed to the first aspect, in which a surface layer that prevents adhesion of the material is formed on at least an inner surface of the in-nozzle flow path of the nozzle tip.

According to the present aspect, since the surface layer that prevents the adhesion of the material is formed on the inner surface of the in-nozzle flow path of the nozzle tip, it is possible to prevent wear of the inner surface of the in-nozzle flow path. In particular, it is effective when the material is a filler-containing resin or the like.

It is preferable that a diameter of an inlet of the in-nozzle flow path of the nozzle tip is the same as a diameter of the outlet of the flow path of the body portion. Here, "the same" means a state in which the flow path on the body portion side and the in-nozzle flow path on the nozzle tip side are substantially uniformly coupled to each other, and it is not necessary to strictly coincide with each other.

By making the diameter of the inlet of the in-nozzle flow path of the nozzle tip equal to the diameter of the outlet of the flow path of the body portion, the material can smoothly flow into the in-nozzle flow path of the nozzle tip from the flow path of the body portion.

The material dispense device according to a seventh aspect of the present disclosure is directed to the first aspect, in which an inner surface of the in-nozzle flow path has a shape tapered toward the dispense opening.

According to the present aspect, since the inner surface of the in-nozzle flow path of the nozzle tip is formed in the shape tapered toward the dispense opening, a structure of a flow path from an opening of an inlet of a portion coupled to the flow path on the body portion side of the in-nozzle flow path in the nozzle tip to the dispense opening positioned at a front end is simplified.

The material dispense device according to an eighth aspect of the present disclosure is directed to the seventh aspect, in which the inner surface of the in-nozzle flow path has a tapered shape inclined in a range of 15° to 60° with respect to an axial center line of the in-nozzle flow path.

When the inclination angle is 15° or less, a length of the nozzle tip increases, a length of a portion where a pressure loss flow path is high increases, and a dispense amount of the material decreases. On the other hand, when the inclination angle is 60° or more, the material is likely to be helically formed at a high flow rate. In the present aspect, from such a background, the inclination angle of the tapered shape is in the range of 15° to 60°.

The material dispense device according to a ninth aspect of the present disclosure is directed to the seventh aspect, in which the inner surface of the in-nozzle flow path includes a first inclined surface and a second inclined surface closer to the dispense opening than is the first inclined surface, and with respect to an axial center line of the in-nozzle flow path, an inclination angle of the first inclined surface is larger than an inclination angle of the second inclined surface.

Here, "the inner surface of the in-nozzle flow path includes a first inclined surface and a second inclined surface closer to the dispense opening than is the first inclined surface" means that the inner surface may include at least the first inclined surface and the second inclined surface, and may further include a third inclined surface continuous with the second inclined surface, a fourth inclined surface, or the like.

According to the present aspect, the inner surface of the in-nozzle flow path includes the first inclined surface and the second inclined surface. As described above, since the inner surface of the in-nozzle flow path is formed by inclined surfaces having a plurality of inclination angles, it is possible to shorten an entire length of the nozzle tip.

A three-dimensional shaping device according to an eleventh aspect of the present disclosure includes: a material dispense device configured to dispense a material for shaping; and a platform on which the material dispensed from the material dispense device is stacked. The material dispense device is the material dispense device according to any one of the above aspects.

According to the present aspect, it is possible to attain the same effect as that of any one of the first aspect to the ninth aspect as the three-dimensional shaping device.

An injection molding device according to a twelfth aspect of the present disclosure includes: a material dispense device configured to dispense a material for injection molding; and a fixing portion configured to fix a mold that receives the material dispensed from the material dispense device. The material dispense device is the material dispense device according to the first aspect.

According to the present aspect, it is possible to attain the same effect as that of any one of the first aspect to the ninth aspect as the injection molding device.

First Embodiment

Hereinafter, a material dispense device and a three-dimensional shaping device including the material dispense device according to a first embodiment will be specifically described with reference to FIGS. 1 to 5.

In the following description, three axes orthogonal to one another are defined as an X axis, a Y axis, and a Z axis, respectively, as shown in each drawing. A Z axis direction corresponds to a vertical direction, that is, a direction in which gravity acts. An X axis direction and a Y axis direction correspond to a horizontal direction. In each drawing, directions indicated by arrows of the three axes (X, Y, Z) is a +direction of each direction, and the opposite direction is a −direction.

Figure 1:
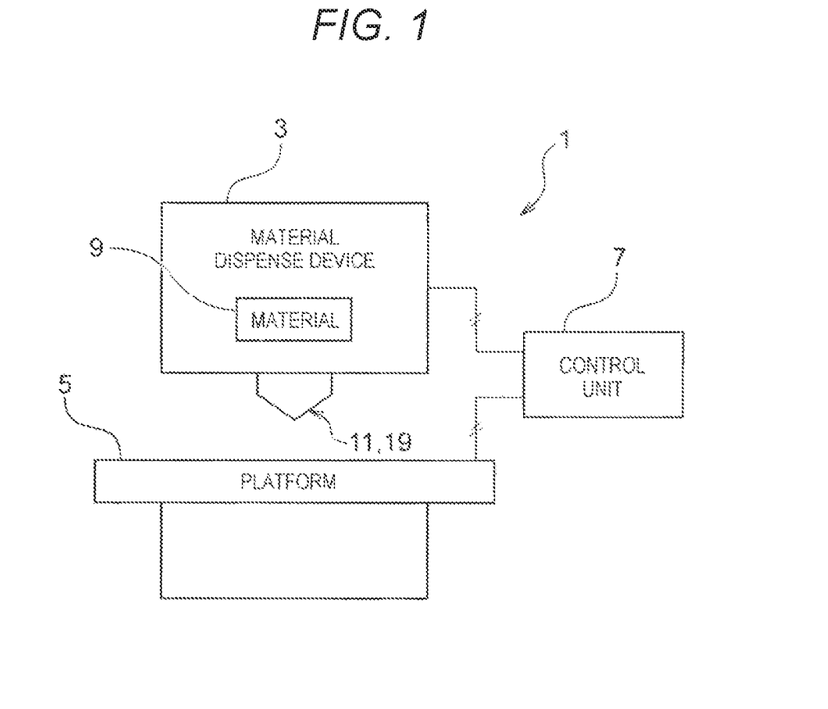
FIG. 1 is a schematic configuration diagram of a three-dimensional shaping device according to a first embodiment.

As shown in FIG. 1, a three-dimensional shaping device 1 according to the present embodiment includes a material dispense device 3 that dispenses a material 9 for shaping, a platform 5 on which the material dispensed from the material dispense device 3 is stacked, and a control unit 7 that controls a stacking operation of the material from the material dispense device 3 to the platform 5.

Here, the material 9 is a filler-containing resin fluid as an example that is plasticized by a plasticizing unit (not shown) provided in the material dispense device 3. In addition, the term "dispense" is used in a meaning including both a case in which the material 9 of the fluid is extruded from an outlet in a continuous thread-shaped state and a case in which the material is dispensed in a granular state.

Figure 2:
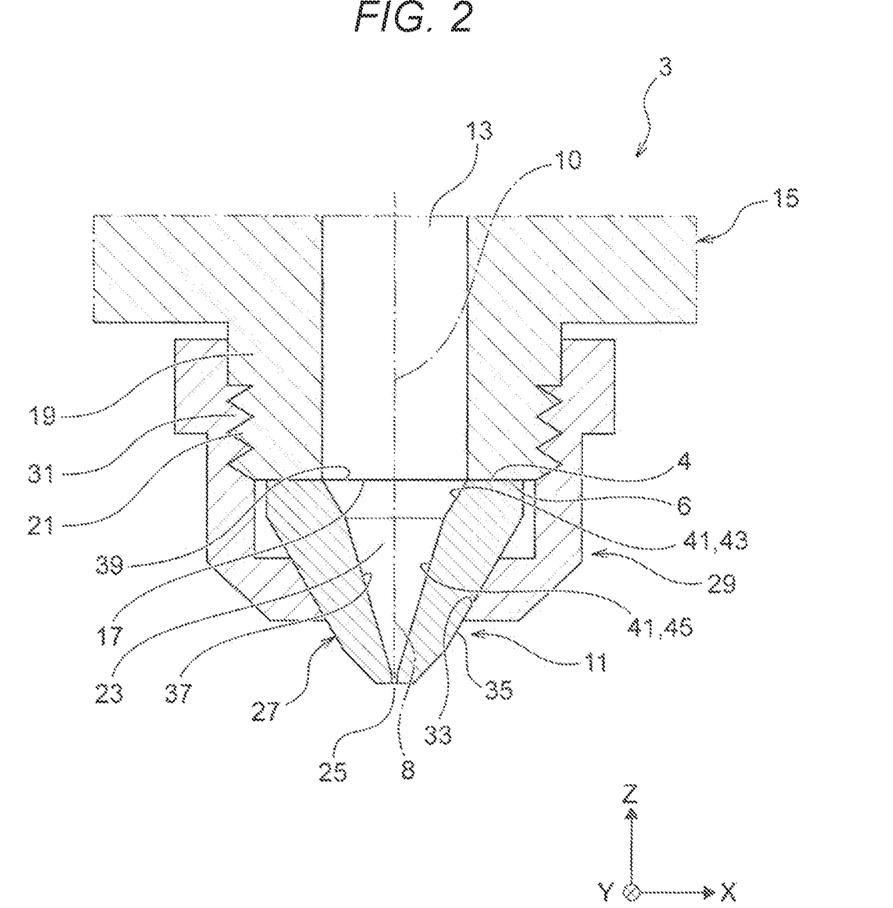
FIG. 2 is a vertical cross-sectional view of a main part of a material dispense device according to the first embodiment.

The material dispense device 3 according to the present embodiment includes a nozzle portion 11 that dispenses the material 9, and a main body portion 15 that includes a flow path 13 for the material 9 and to which the nozzle portion 11 is attached. The main body portion 15 includes a body portion 19 having an outlet 17 of the flow path 13, and a male screw 21 provided at an outer periphery of the body portion 19.

The nozzle portion 11 includes a dispense opening 25 at a front end of an in-nozzle flow path 23 for the material 9, and includes a nozzle tip 27 that is pressed against the body portion 19 in an arrangement of communicating with the flow path 13. The nozzle portion 11 further includes a pressing member 29 that presses the nozzle tip 27 against the body portion 19 in a state in which the dispense opening 23 is exposed to the outside. The pressing member 29 includes a female screw 31 at the inner periphery thereof.

By fastening the female screw 31 of the pressing member 29 to the male screw 21 of the body portion 19, the nozzle tip 27 is pressed against the body portion 19.

Body Portion

Figure 3A:
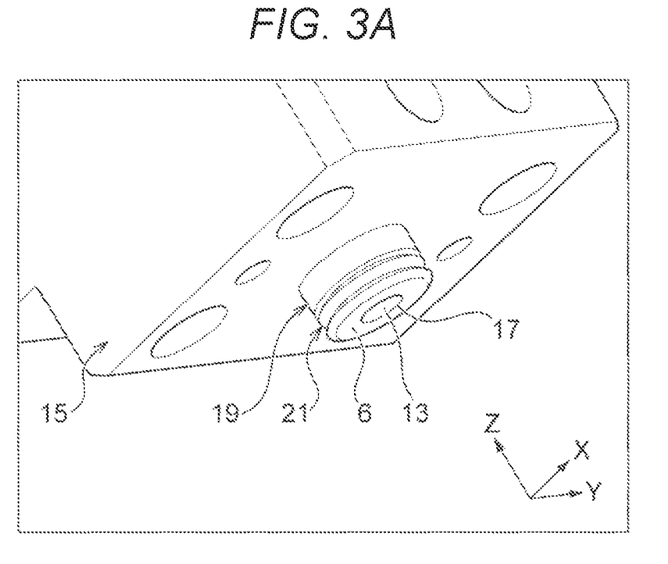
FIG. 3A is a perspective view of a body portion of the material dispense device according to the first embodiment.
Figure 3B:
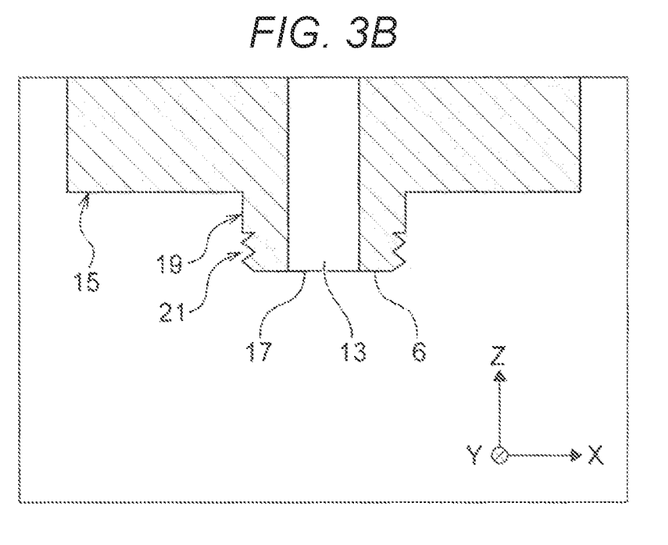
FIG. 3B is a vertical cross-sectional view of the body portion.

As shown in FIGS. 3A and 3B, in the present embodiment, the body portion 19 is a cylindrical protrusion portion that is formed integrally with the main body portion 15 and that protrudes from one surface of the main body portion 15. The body portion 19 has the flow path 13 for the material 9 therein, and the outlet 17 for the material is positioned at the front end of the body portion 19.

The main body portion 15 and the body portion 19 are made of a material having high hardness, such as martensitic stainless steel or pre-hard steel. The male screw 21 is provided at the outer periphery of the front end side (−Z direction) of the body portion 19.

Pressing Member

Figure 4A:
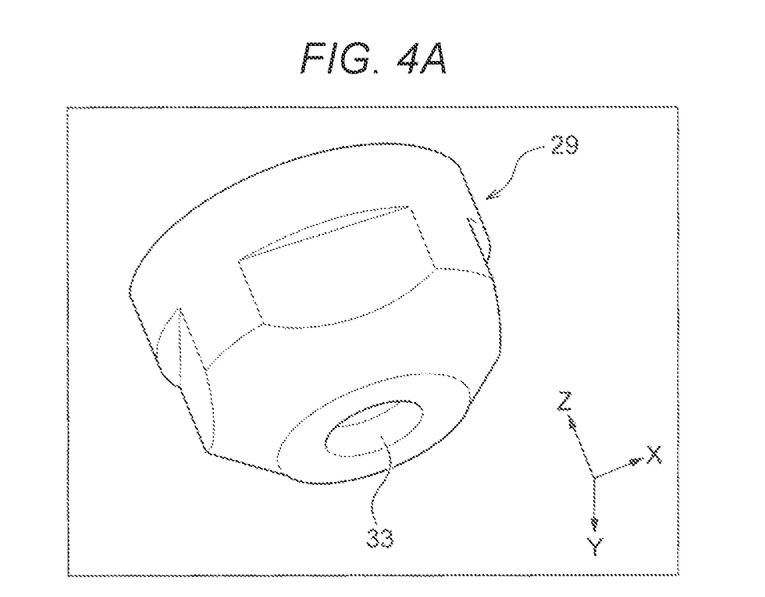
FIG. 4A is a perspective view of a pressing member of the material dispense device according to the first embodiment.
Figure 4B:
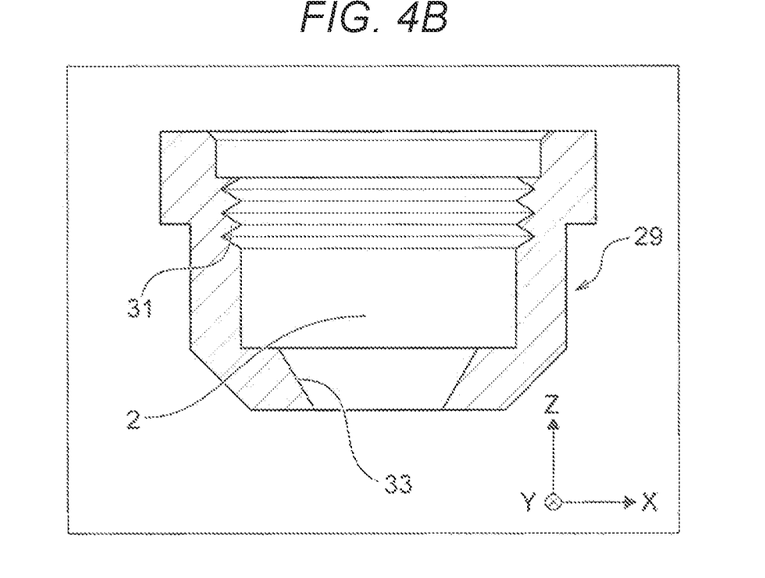
FIG. 4B is a vertical cross-sectional view of the pressing member.

As shown in FIGS. 4A and 4B, in the present embodiment, the pressing member 29 has an internal structure 2 that holds the nozzle tip 27 inside. The pressing member 29 has an exposure opening 33 that exposes the dispense opening 25 of the nozzle tip 27 to the outside in a state in which the nozzle tip 27 is held in the internal structure 2. In the present embodiment, the exposure opening 33 is formed in a shape matching a tapered shape 35 of an outer surface of the nozzle tip 27 to be described later.

The pressing member 29 is made of a material having a high thermal conductivity, such as pre-hard steel, copper or an alloy thereof, or an aluminum alloy. The female screw 31 is provided at an inner surface on a base end side (+Z direction) of the pressing member 29.

Nozzle Tip

Figure 5A:
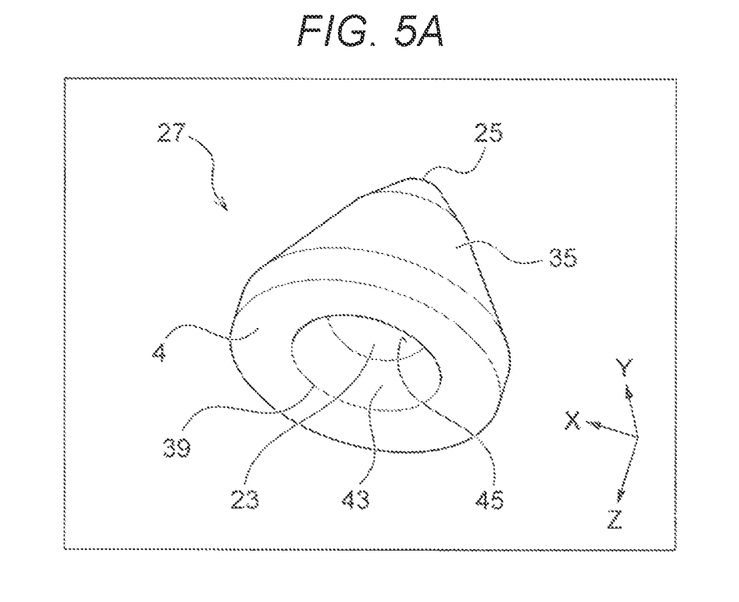
FIG. 5A is a perspective view of a nozzle tip of the material dispense device according to the first embodiment.
Figure 5B:
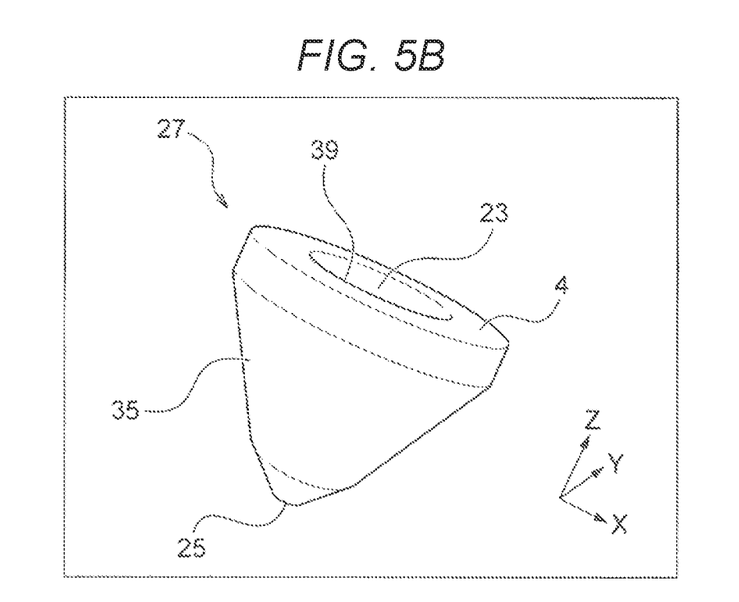
FIG. 5B is a vertical cross-sectional view of the nozzle tip.

As shown in FIGS. 5A and 5B, in the present embodiment, the nozzle tip 27 has the shape 35 tapered toward the dispense opening 25 on the outer surface. Here, the tapered shape 35 is a conical shape, and the tapered shape 35 is not limited thereto and may be a pyramid shape or the like. The nozzle tip 27 does not need to be provided with a screw portion such as a male screw.

The nozzle tip 27 is made of a material such as austenitic stainless steel or martensitic stainless steel.

A surface layer 37 that prevents adhesion of the material 9 is formed on an inner surface 41 of the in-nozzle flow path 23 of the nozzle tip 27. Here, the surface layer 37 is provided by a surface treatment such as a nitriding treatment. The surface treatment is not limited to the nitriding treatment, and a surface treatment capable of preventing the adhesion thereof is selected according to a type of the material 9.

The surface layer 37 is not limited to being provided on the inner surface of the in-nozzle flow path 23 of the nozzle tip 27, and may be provided on an outer surface or an end surface 4 to be described later in addition to the inner surface.

In the present embodiment, as shown in FIG. 1, a diameter of an inlet 39 of the in-nozzle flow path 23 of the nozzle tip 27 is the same as a diameter of the outlet 17 of the flow path 13 of the body portion 19.

Here, the fact that the diameter of the inlet 39 and the diameter of the outlet 17 are "the same" means that the flow path 13 on the body portion 19 side and the in-nozzle flow path 23 on the nozzle tip 27 side are substantially uniformly coupled to each other, and it is not necessary to strictly coincide with each other.

In the present embodiment, the inner surface 41 of the in-nozzle flow path 23 of the nozzle tip 27 is formed in a shape tapered toward the dispense opening 25. The dispense opening 25 is positioned at a front end of the tapered shape.

The inner surface 41 of the in-nozzle flow path 23 has a tapered shape inclined in a range of 15° to 60° with respect to an axial center line 8 of the in-nozzle flow path 23. That is, the inclination angle is an angle with respect to the axial center line 8 of the in-nozzle flow path 23.

In the present embodiment, the inner surface 41 of the in-nozzle flow path 23 includes a first inclined surface 43 and a second inclined surface 45 closer to the dispense opening 25 than is the first inclined surface 43. With respect to the axial center line 8 of the in-nozzle flow path 23, an inclination angle of the first inclined surface 43 is larger than an inclination angle of the second inclined surface 45.

That is, the tapered shape of the in-nozzle flow path 23 has the first inclined surface 43 positioned on the body portion 19 side and the second inclined surface 45 continuous with the first inclined surface 43. A degree of taper of the first inclined surface 43 is higher than a degree of taper of the second inclined surface 45. That is, the inclination angle of the first inclined surface 43 is larger than the inclination angle of the second inclined surface 45.

Here, the inner surface 41 may include at least the first inclined surface 43 and the second inclined surface 45, and may further include a third inclined surface continuous with the second inclined surface 45, a fourth inclined surface, or the like.

The end surface 4 on the base end side (+Z direction) of the nozzle tip 27 and an end surface 6 of the body portion 19 are in close contact with each other to form a sealing surface.

In the present embodiment, hardness of the nozzle tip 27 is lower than the hardness of the body portion 19. That is, the nozzle tip 27 is elastically deformed by a pressing force of the pressing member 29 and is pressed against the hard body portion 19. Here, when an example is described in which the degree of hardness is compared with the Rockwell hardness, the hardness of the body portion 19 is HRC 58, and the hardness of the nozzle tip 27 is HRC 40. It is needless to say that the hardness of both of the body portion 19 and the nozzle tip 27 is not limited to these.

In the present embodiment, a thermal conductivity of the nozzle tip 27 is lower than a thermal conductivity of the body portion 19. That is, a degree of freedom in selecting the material that can be used for the nozzle tip 27 which is a consumable item to be replaced is increased, and the cost is reduced.

Assembly of Nozzle Portion to Main Body Portion

The nozzle tip 27 is set in the exposure opening 33 of the pressing member 29 in a state in which the dispense opening 25 at the front end of the nozzle tip 27 is exposed to the outside from the exposure opening 33 of the pressing member 29. In this set state, the female screw 31 of the pressing member 29 is fastened to the male screw 21 of the body portion 19 of the main body portion 15. By this fastening, the nozzle tip 27 is fixed at a position in a state in which the end surface 4 of the nozzle tip 27 is pressed against the end surface 6 of the body portion 19.

In this state, in the present embodiment, the axial center line 8 of the in-nozzle flow path 23 and an axial center line 10 of the flow path 13 of the body portion 19 are in a straight line. That is, it is possible to easily achieve an alignment of both the axial center lines 8 and 10.

Description of Effects according to First Embodiment (1) According to the material dispense device 1 in the present embodiment, the male screw 21 is provided at the outer periphery of the body portion 19, and the female screw 31 is provided at the pressing member 29 that presses the nozzle tip 27 against the body portion 19. That is, it is not necessary to provide a male screw at the nozzle tip 27 as in the related art. By fastening the female screw 31 of the pressing member 29 to the male screw 21 of the body portion 19, the nozzle tip 27 is fixed in a state of being pressed against the body portion 19. Therefore, even if foreign matter adheres to the outer surface of the nozzle tip 27 due to continuous use, and further, foreign matter adheres to a fastening portion of the female screw 31 and the male screw 21, the fastening portion is positioned on an outer peripheral side of the body portion 19 and is not positioned on an inner surface side of the flow path 13. Therefore, when the nozzle tip 27 is replaced, the foreign matter is less likely to be mixed into the flow path 13 for the material 9. That is, it is possible to reduce a possibility that, foreign matter is mixed during replacement of the nozzle tip 27 and nozzle clogging is caused.

According to the present embodiment, it is possible to easily increase the diameters of the female screw 31 of the pressing member 29 and the male screw 21 of the body portion 19. Accordingly, it is possible to tighten the pressing member 29 to the body portion 19 with a stronger axial force, and it is possible to reduce leakage of the material from a portion, that is, the sealing surface where the nozzle tip 27 is pressed against and comes into contact with the body portion 19.

According to the present embodiment, since it is not necessary to provide a screw portion such as a male screw at the nozzle tip 27, the manufacturing thereof becomes easy. Accordingly, it is possible to reduce the manufacturing cost of the nozzle tip 27 which is also a replacement target as a consumable item.

(2) According to the present embodiment, the outer surface of the nozzle tip 27 has the shape 35 tapered toward the dispense opening 25. Further, the pressing member 29 has the exposure opening 33 that has a shape matching the outer surface of the nozzle tip 27 and that exposes the dispense opening 25 of the nozzle tip 27 to the outside. Therefore, by fastening the pressing member 29 to the body portion 19 in a state in which the dispense opening 25 of the nozzle tip 27 is exposed to the outside from the exposure opening 33 of the pressing member 29, it is possible to attach the nozzle tip 27 to the body portion 19 in a state in which the nozzle tip 27 is strongly pressed against the body portion 19.

(3) According to the present embodiment, the axial center line 8 of the in-nozzle flow path 23 and the axial center line 10 of the flow path 13 of the body portion 19 are in the straight line in a state in which the tapered shape 35 of the nozzle tip 27 is set in the exposure opening 33 of the pressing member 29. Therefore, when the female screw 31 of the pressing member 29 is fastened to the male screw 21 of the body portion 19 in the state in which the nozzle tip 27 is set in the exposure opening 33, since the axial center line 8 of the in-nozzle flow path 23 and the axial center line 10 of the flow path 13 of the body portion 19 are in the straight line, the alignment of both the axial center lines 8 and 10 can be easily achieved.

(4) According to the present embodiment, the degree of hardness of the nozzle tip 27 is lower than that of the body portion 19. Accordingly, the nozzle tip 27 is elastically deformed by the pressing force of the pressing member 29 and is pressed against the hard body portion 19. Therefore, the nozzle tip 27 can be attached to the body portion 19 with good adhesion.

(4) According to the present embodiment, the thermal conductivity of the nozzle tip 27 is lower than that of the body portion 19. Accordingly, a degree of freedom in selecting the material that can be used for the nozzle tip 27 is increased, and design and manufacture are facilitated. In addition, cost reduction can also be achieved.

(5) According to the present embodiment, since the surface layer 37 that prevents the adhesion of the material 9 is formed on the inner surface of the in-nozzle flow path 23 of the nozzle tip 27, it is possible to prevent the wear of the inner surface of the in-nozzle flow path 23. In particular, it is effective when the material 9 is a filler-containing resin or the like.

(6) According to the present embodiment, since the inner surface 41 of the in-nozzle flow path 23 of the nozzle tip 27 is formed in the shape tapered toward the dispense opening 25, a structure of a flow path from the opening of the inlet 39 of a portion coupled to the flow path 13 on the body portion 19 side of the in-nozzle flow path 23 in the nozzle tip 27 to the dispense opening 25 positioned at the front end is simplified.

(7) According to the present embodiment, the inner surface 41 of the in-nozzle flow path 23 has a tapered shape inclined in an angle range of 15° to 60° with respect to the axial center line 8 of the in-nozzle flow path 23. When the angle is 15° or less, a length of the nozzle tip 27 increases, a length of a portion where a pressure loss flow path is high increases, and a dispense amount of the material 9 decreases. On the other hand, when the angle is 60° or more, the material 9 is likely to be helically formed at a high flow rate. In the present aspect, from such a background, the angle is in the range of 15° to 60°.

(8) According to the present embodiment, the inner surface 41 of the in-nozzle flow path 23 includes the first inclined surface 43 and the second inclined surface 45. As described above, since the inner surface 41 is formed by inclined surfaces having a plurality of inclination angles, it is possible to shorten an entire length of the nozzle tip 27.

Second Embodiment

Next, an injection molding device according to a second embodiment will be described with reference to FIG. 6. The same components as those according to the first embodiment are denoted by the same reference numerals, and the description thereof will be omitted.

Figure 6:
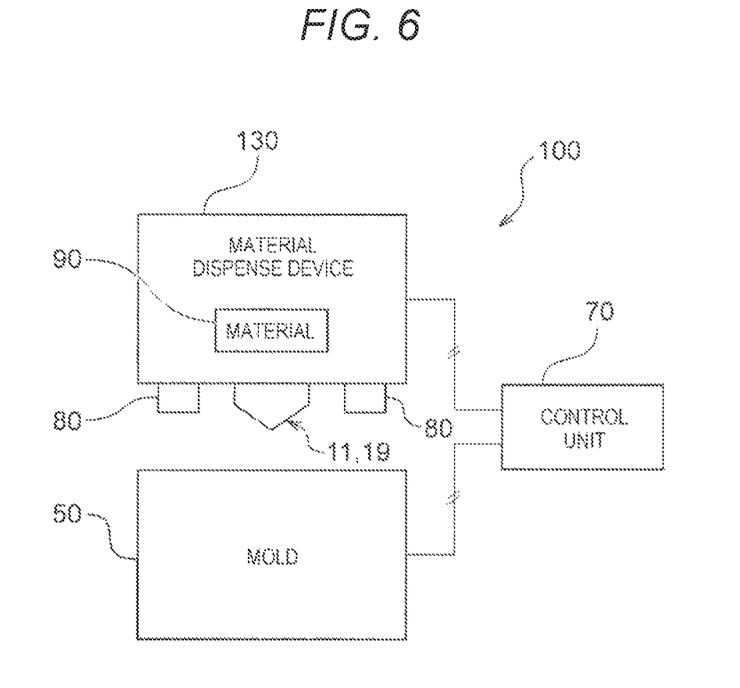
FIG. 6 is a schematic configuration diagram of an injection molding device according to a second embodiment.

As shown in FIG. 6, an injection molding device 100 according to the present embodiment includes a material dispense device 130 that dispenses a material 90 for injection molding, a fixing portion 80 that fixes a mold 50 that receives the material 90 dispensed from the material dispense device 130, and a control unit 70 that controls dispense and a molding operation of the material 90 from the material dispense device 130 to the mold 50. The material dispense device 130 basically has the same structure as that of the material dispense device 1 according to the first embodiment.

According to the injection molding device 100 in the present embodiment, the same effects as those according to the first embodiment can be attained as the injection molding device 100.

Other Embodiments

The material dispense device 3 and the three-dimensional shaping device 1 or the injection molding device 100 including the material dispense device 3 according to the present disclosure are based on the configuration according to the embodiments described above, and it is needless to say that the partial configuration can be changed or omitted without departing from the gist of the present disclosure.

In the above embodiments, the outer surface of the nozzle tip 27 has the tapered shape 35, and a stepped structure may be used instead of the tapered shape portion 35. When the stepped structure is used, a shape of the exposure opening 33 of the pressing member 29 can be changed to a shape matching the stepped structure.

What is claimed is:

1. A material dispense device comprising:
a nozzle portion configured to dispense a material; and
a main body portion that has a flow path for the material and to which the nozzle portion is attached, wherein
the main body portion includes
a body portion provided with a male screw at an outer periphery thereof and having an outlet of the flow path,
the nozzle portion includes
a nozzle tip that has a dispense opening at a front end of an in-nozzle flow path, and that is pressed against the body portion in an arrangement in which the in-nozzle flow path and the outlet of the flow path communicate with each other, and
a pressing member configured to press the nozzle tip against the body portion in a state in which the dispense opening is exposed to outside, and having a female screw capable of being fastened to the male screw at an inner periphery of the pressing member,
the nozzle tip is pressed against the body portion by fastening the male screw and the female screw,
a thermal conductivity of the nozzle tip is lower than a thermal conductivity of the body portion, and
the nozzle tip is elastically deformable.

2. The material dispense device according to claim 1, wherein
an outer surface of the nozzle tip has a shape tapered toward the dispense opening,
an inner surface of the pressing member has a shape matching the outer surface of the nozzle tip, and
the pressing member has an exposure opening that exposes the dispense opening of the nozzle tip to outside.

3. The material dispense device according to claim 2, wherein
in a state in which the dispense opening is positioned inside the exposure opening and the male screw and the female screw are coupled to each other, an axial center line of the in-nozzle flow path and an axial center line of the flow path of the body portion are in a straight line.

4. The material dispense device according to claim 1, wherein hardness of the nozzle tip is lower than hardness of the body portion.

5. The material dispense device according to claim 1, wherein
a surface layer preventing adhesion of the material is formed on at least an inner surface of the in-nozzle flow path of the nozzle tip.

6. The material dispense device according to claim 1, wherein
an inner surface of the in-nozzle flow path has a shape tapered toward the dispense opening.

7. The material dispense device according to claim 6, wherein
the inner surface of the in-nozzle flow path has a tapered shape inclined in an angle range of 15° to 60° with respect to an axial center line of the in-nozzle flow path.

8. The material dispense device according to claim 6, wherein
the inner surface of the in-nozzle flow path includes
a first inclined surface and a second inclined surface closer to the dispense opening than is the first inclined surface, and
with respect to an axial center line of the in-nozzle flow path, an inclination angle of the first inclined surface is larger than an inclination angle of the second inclined surface.

9. A three-dimensional shaping device comprising:
a material dispense device configured to dispense a material for shaping; and
a platform on which the material dispensed from the material dispense device is stacked, wherein
the material dispense device is the material dispense device according to claim 1.

10. An injection molding device comprising:
a material dispense device configured to dispense a material for injection molding; and
a fixing portion configured to fix a mold that receives the material dispensed from the material dispense device, wherein
the material dispense device is the material dispense device according to claim 1.

* * * * *